(12) United States Patent
Watanabe et al.

(10) Patent No.: US 12,728,725 B2
(45) Date of Patent: Sep. 8, 2026

(54) DISPLAY CONTROL DEVICE, DISPLAY DEVICE, AND DISPLAY CONTROL METHOD

(71) Applicant: Nippon Seiki Co., Ltd., Niigata (JP)

(72) Inventors: Midori Watanabe, Niigata (JP); Hanako Honma, Niigata (JP); Yuki Masuya, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 52 days.

(21) Appl. No.: 19/005,289

(22) Filed: Dec. 30, 2024

(65) Prior Publication Data

US 2025/0249748 A1 Aug. 7, 2025

(30) Foreign Application Priority Data

Feb. 2, 2024 (JP) ................................ 2024-014544

(51) Int. Cl.

*B60K 35/81* (2024.01)
*B60K 35/21* (2024.01)
*B60K 35/28* (2024.01)
*B60K 35/29* (2024.01)

(52) U.S. Cl.

CPC ............ *B60K 35/81* (2024.01); *B60K 35/211* (2024.01); *B60K 35/28* (2024.01); *B60K 35/29* (2024.01); *B60K 2360/179* (2024.01)

(58) Field of Classification Search

CPC ...... B60K 35/81; B60K 35/211; B60K 35/28; B60K 35/29; B60K 2360/179; B60K 35/22; B60K 35/23; B60K 35/233; B60K 2360/177; B60K 2360/31

See application file for complete search history.

(56) References Cited

U.S. PATENT DOCUMENTS 10,647,254 B2 * 5/2020 Nagasawa .............. B60Q 9/008
2016/0173867 A1 6/2016 Ichihashi et al.
2020/0116518 A1 4/2020 Lee
2022/0036598 A1 * 2/2022 Kim ...................... B60K 35/22

FOREIGN PATENT DOCUMENTS

JP 2015-194709 A 11/2015
JP 2020-64047 A 4/2020

* cited by examiner

*Primary Examiner* — Bao Long T Nguyen
(74) *Attorney, Agent, or Firm* — Rimon P.C.

(57) ABSTRACT

A control unit of a display control device performs size adjustment processing of gradually increasing a size of a virtual object maintained at a predetermined real space position in response to approach of a vehicle to the predetermined real space position until the size becomes a second size from a first size, and performs adjustment such that, in at least a part of a period of the size adjustment processing, when the virtual object is assumed to be a real object existing in a real space, a size change rate of the virtual object with respect to a perceptual distance is smaller than a size change rate of the real object.

9 Claims, 12 Drawing Sheets

Y
Z
X
2
9
VOB3
FU3
6
7

VOB3
FU3
9
6
7
2

2
VOB3
9
FU3
6
7

DISPLAY CONTROL DEVICE, DISPLAY DEVICE, AND DISPLAY CONTROL METHOD

CROSS-REFERENCE TO RELATED APPLICATIONS

This application claims the benefit of foreign priority to Japanese Patent Application No. 2024-014544 filed on Feb. 2, 2024, the entire contents of each of which are hereby incorporated by reference.

TECHNICAL FIELD

The present invention relates to a display control device installed in a vehicle such as an automobile, a display device, and a display control method.

BACKGROUND ART

Patent Document 1 (refer to FIGS. 3, [0017] to [0019]) discloses a technique of, by displaying a virtual image for a left viewpoint and a virtual image for a right viewpoint having a parallax on a first display position in front of a vehicle, causing a viewer to perceive a stereoscopic virtual object as if the virtual object existed on a second display position on the farther side than the first display position.

Patent Document 2 (refer to FIG. 17, [0165]) provides an example of display control in which a first route guidance content for guiding a vehicle is moved, and then a fourth route guidance content indicating a change point of a traveling direction of the vehicle (direction change point) is displayed.

PRIOR ART DOCUMENT

Patent Document

Patent Document 1: Japanese Unexamined Patent Publication No. 2015-194709

Patent Document 2: Japanese Unexamined Patent Publication No. 2020-64047

SUMMARY OF INVENTION

Technical Problem

From the studies by the present inventors, the following problems have been clarified.

(1) In a display example illustrated in FIG. 17 of Patent Document 2, a first arrow mark as a virtual object for guiding a traveling route of a vehicle is moved along a road, and when the first arrow mark reaches a right turn point as a direction change point, next, a second arrow mark as a virtual object for guiding a right turn is displayed so as to be superimposed on a right turn road.

Here, when the first arrow mark is displayed such that the size thereof decreases as a distance from a viewer increases, a natural sense of perspective can be given to the first arrow mark as a virtual object similar to that of a real object existing in a real space.

In this case, the size of the second arrow mark (virtual object) for guiding a right turn is also adjusted such that the same sense of perspective as that of the first arrow mark is generated.

Here, when the right turn point is considerably far viewed from the viewer, the size of the second arrow mark (virtual object) for guiding a right turn becomes considerably small, and it may be difficult for the viewer to visually recognize the second arrow mark.

In addition, as the vehicle travels, the vehicle gradually approaches the right turn point with the passage of time, but the visual recognition sensitivity of the human eye is considerably low with respect to a distant object. Therefore, when the same sense of perspective as that of the real object in the real world is reproduced for the second arrow mark (virtual object) in a far region, it is difficult for the viewer to perceive an increase in the size of the second arrow mark (virtual object) due to the approach of the vehicle, and it can be assumed that the viewer feels that the size hardly changes.

In this case, it is difficult for the viewer to actually feel that the vehicle is approaching the right turn point.

(2) In order to reduce the above-described problem (1), it is conceivable to increase the size of the second arrow mark (virtual object) at the right turn point as compared with the size of the real object such that the second arrow mark can be easily viewed. Thus, the visibility of the second arrow mark (virtual object) by the viewer is improved.

However, in this case, when a state in which the vehicle considerably approaches the right turn point is assumed, since the visual recognition sensitivity of the human eye is sufficiently high with respect to a body at a near position, the second arrow mark (virtual object) is rapidly enlarged with the approach of the vehicle, and thus the size of the second arrow mark becomes excessively larger than that of the real object, which may cause a sense of discomfort.

Such new problems have been clarified by the present inventors. Such problems are not described in Patent Documents 1 and 2 described above, and countermeasures against the problems are also not described.

It is an object of the present invention to prevent, when a virtual object displayed on the far side viewed from a viewer riding in a vehicle is too small, the visual recognition and the perception of a size change of the virtual object from becoming difficult, while, to prevent, when the virtual object is displayed on the near side as the vehicle travels, the size of the virtual object from becoming too large.

Other objects of the present invention will become apparent to those skilled in the art by referring to the aspects and the best mode exemplified below, and the accompanying drawings.

Solution to Problem

Hereinafter, in order to easily understand the outline of the present invention, aspects according to the present invention will be exemplified.

In a first aspect, a display control device installed in a vehicle, including: a control unit that executes display control when a virtual object is displayed such that a viewer riding in the vehicle can visually recognize the virtual object, in which the control unit displays the virtual object having a first size such that the viewer perceives the virtual object as if the virtual object existed at a predetermined real space position in front of the vehicle, the control unit performs size adjustment processing of gradually increasing a size of the virtual object maintained at the predetermined real space position in response to approach of the vehicle to the predetermined real space position until the size of the virtual object becomes a second size, and, when a distance from a viewpoint position of the viewer to the predetermined real space position is referred to as a perceptual distance, during the size adjustment processing, the control unit performs adjustment such that, in at least a part of a period in which the size of the virtual object becomes the second size from the first size, when the virtual object is assumed to be a real object existing in a real space, a size change rate of the virtual object with respect to the perceptual distance is smaller than a size change rate of the real object.

In the first aspect, the size adjustment processing of adjusting the size of the virtual object is performed in a period in which the vehicle is approaching the predetermined real space position.

Even when the predetermined real space position is considerably far from the viewer, the virtual object can be displayed in a relatively large and easily-viewable size by appropriately adjusting the size of the virtual object.

However, when the size of the virtual object displayed in an easily-viewable size in a far region is adjusted at the same size change rate (the size change rate with respect to the perceptual distance) as that of the real object in the real space as the vehicle travels, the size of the virtual object becomes too large in a near region, which may cause a sense of discomfort.

Therefore, in the present aspect, the size adjustment processing is performed, and, in at least a part of the period in which the vehicle is approaching the predetermined real space position, the size change rate of the virtual object, in other words, the degree of the size change with respect to the distance between the viewer and the real space position (perceptual distance) when the size of the virtual object gradually increases is set to be smaller than the size change rate of the real object (this may be referred to as a real world size change rate).

Accordingly, the size of the virtual object in the near region as viewed from the viewer can be prevented from becoming too large.

Therefore, the size of the virtual object can be controlled to an appropriate size from the far region to the near region, and improvement in viewability and suppression of a sense of discomfort can be achieved.

In a second aspect depending from the first aspect, by displaying a virtual image for a left viewpoint and a virtual image for a right viewpoint having a parallax on a virtual first display surface set in front of the vehicle, the control unit may cause the viewer to perceive the virtual object as if the virtual object existed on a virtual second display surface set on a farther side than the first display surface.

In the second aspect, for example, the virtual object can be displayed on the second display surface located at a position farther than the first display surface on which the virtual image is displayed as viewed from the viewer by a parallax-type stereoscopic image display device (parallax-type 3D HUD device or the like). When displaying the virtual object, the size of the virtual object that the viewer perceives can be variably controlled by, for example, appropriately adjusting the size of the virtual images for the left and right viewpoints displayed on the first display surface.

In a third aspect depending from the first or second aspect, when the perceptual distance is denoted by Ds, the size of the virtual object at the predetermined real space position is denoted by L, arctangent that is an inverse trigonometric function of tangent is represented as Atan, a function that converts an angle in radians to an angle in degrees is represented as degrees, θ is degrees (Atan (L/2Ds)), 2θ is 2*degrees (Atan (L/2Ds)), and 2θ is a viewing angle, the control unit may use the viewing angle 2θ as an index for indicating an apparent size of the virtual object that the viewer perceives, specify the viewing angle 2θ corresponding to the perceptual distance on the basis of a function indicating a relationship between the perceptual distance and the viewing angle 2θ, and variably control the size of the virtual object on the basis of the specified viewing angle 2θ.

In the third aspect, the size of the virtual object whose appearance changes due to the sensitivity of the human (viewer's) eye can be objectively determined by the viewing angle (=2θ).

For example, a function (characteristic line) that associates the distance between the viewer and the predetermined real space position with the viewing angle 2θ is prepared in advance, the viewing angle 2θ corresponding to the distance is calculated at high speed using the function, and the apparent size of the virtual object is variably controlled on the basis of the viewing angle 2θ, so that the size adjustment processing can be achieved at high speed.

In a fourth aspect depending from any one of the first to third aspects, when the period in which the size of the virtual object becomes the second size from the first size is divided into a far period in which the vehicle is located relatively far from the predetermined real space position and a near period in which the vehicle is located relatively near the predetermined real space position, the control unit may set the size change rate of the virtual object to be the same as the size change rate of the real object in the near period.

In the fourth aspect, by setting the size change rate of the virtual object to be the same as the size change rate of the real object in the near region viewed from the viewer, a natural sense of perspective similar to the sense of perspective of the real object in the real space can be generated in the virtual object. This contributes to a reduction in a sense of discomfort.

In a fifth aspect depending from any one of the first to fourth aspects, when the period in which the size of the virtual object becomes the second size from the first size is divided into a far period in which the vehicle is located relatively far from the predetermined real space position and a near period in which the vehicle is located relatively near the predetermined real space position, the control unit may set the size change rate of the virtual object to be larger than the size change rate of the real object in the far period.

In the fifth aspect, the size change rate of the virtual object with respect to the distance in the far region is set to be larger than the size change rate of the real object with respect to the distance to emphasize the change, and thus it becomes easy to grasp a sense of perspective. In other words, the viewer can easily perceive the approach of the virtual object even in the far region.

The real object in the real space has a considerably small size change rate with respect to the distance change in the far region, and therefore, the virtual object may be perceived as if the virtual object did not approach the predetermined real space position.

According to the present aspect, even in the far region, the viewer can easily perceive the size change of the virtual object (in other words, the change in a sense of perspective) as the vehicle travels. In other words, for example, the viewer can intuitively recognize that the vehicle is approaching the direction change point or the like.

In a sixth aspect depending from any one of the first to fifth aspects, prior to the size adjustment processing, the control unit moves a virtual object for forward guidance, which guides forward traveling of the vehicle, from a near position of the vehicle to the far predetermined real space position, and, during the movement, when the virtual object for forward guidance is assumed to be the real object, the control unit may adjust a size of the virtual object for forward guidance by the size change rate of the real object.

In the sixth aspect, prior to the above size adjustment processing, the virtual object for forward guidance is moved from the near region to the far predetermined real space position as viewed from the viewer, and guidance of a traveling route or the like of the vehicle is performed. At this time, the size change rate of the virtual object for forward guidance with respect to the perceptual distance (the distance from the viewer to the predetermined real space position) can be adjusted to be the same as the size change rate of the real object in the real space. The display processing may be referred to as "initial processing."

The viewer can roughly perceive the distance to the predetermined real space position (for example, a direction change position of the vehicle) and can feel a sense of security by the initial processing.

When the virtual object for forward guidance reaches the predetermined real space position, even if the size thereof is too small to be viewed, for example, the virtual object for direction change guidance is displayed in an easily-viewable size, and the visibility is improved.

Moreover, thereafter, in a process in which the vehicle is approaching the predetermined real space position, appropriate size adjustment is performed by the above size adjustment processing, so that an appropriate sense of perspective can be given to the virtual object for direction change guidance or the like, and a sense of discomfort is suppressed.

Therefore, it becomes possible to display an easily-viewable image for guidance (navigation image) with little sense of discomfort.

In a seventh aspect depending from the sixth aspect, the virtual object subject to the size adjustment processing may be a virtual object for direction change guidance, which guides a direction change of the vehicle.

In the seventh aspect, the virtual object subject to the size adjustment processing can be, for example, a guide mark for direction change guidance (for left turn or right turn guidance), which guides a direction change (for example, left turn or right turn) of the vehicle.

Accordingly, the viewer can reliably recognize the direction change position (left turn or right turn position) by the guide mark having an appropriate size.

In an eighth aspect, a display device includes: an image generation unit that generates an image; a display unit that displays the image; and the display control device according to any one of the first to seventh aspects, in which the virtual object is perceived by the viewer by projecting display light of the image onto a member to be projected included in the vehicle.

According to the eighth aspect, it is possible to achieve a display device (preferably, a projection-type display device such as an HUD device) capable of preventing, when a virtual object displayed on the far side viewed from a viewer riding in a vehicle is too small, the visual recognition and the perception of a size change of the virtual object from becoming difficult, while, capable of preventing, when the virtual object is displayed on the near side as the vehicle travels, the size of the virtual object from becoming too large.

In a ninth aspect, a display control method for displaying a virtual object having a first size such that a viewer riding in a vehicle perceives the virtual object as if the virtual object existed at a predetermined real space position in front of the vehicle, including: a step of performing size adjustment processing of gradually increasing a size of the virtual object maintained at the predetermined real space position in response to approach of the vehicle to the predetermined real space position until the size of the virtual object becomes a second size; and, when a distance from a viewpoint position of the viewer to the predetermined real space position is referred to as a perceptual distance, during the size adjustment processing, a step of performing adjustment such that, in at least a part of a period in which the size of the virtual object becomes the second size from the first size, when the virtual object is assumed to be a real object existing in a real space, a size change rate of the virtual object with respect to the perceptual distance is smaller than a size change rate of the real object.

According to the ninth aspect, it is possible to achieve a display control method capable of preventing, when a virtual object displayed on the far side viewed from a viewer riding in a vehicle is too small, the visual recognition and the perception of a size change of the virtual object from becoming difficult, while, capable of preventing, when the virtual object is displayed on the near side as the vehicle travels, the size of the virtual object from becoming too large.

Those skilled in the art will readily understand that the exemplified aspects according to the present invention may be modified without departing from the spirit of the present invention.

BRIEF DESCRIPTION OF DRAWINGS

FIGS. 4A-1 to 4A-3 are diagrams illustrating a problem when the size of the virtual object is changed at the same size change rate as that of a real object after the display example of FIG. 3A-2.

FIGS. 5A-1 to 5A-3 are diagrams illustrating display examples based on size adjustment processing of the virtual object.

FIGS. 7A-1 and 7A-2 are diagrams illustrating an example of control when the size of the virtual object is controlled using a function that associates the viewing angle 2θ with a distance from a viewer to a predetermined real space position (perceptual distance), and an example of a change in the size of the virtual object when the control is performed.

FIGS. 8A-1 and 8A-2 are diagrams illustrating another example of the control when the size of the virtual object is controlled using the function that associates the viewing angle 2θ with the distance from the viewer to the predetermined real space position (perceptual distance), and another example of the change in the size of the virtual object when the control is performed.

FIGS. 10A-1 and 10A-2 are diagrams illustrating a control example when size adjustment of the virtual object is achieved by variably controlling the distance from the viewer to the predetermined real space position (perceptual distance), and an example of the change in the size of the virtual object when the control is performed.

FIGS. 11A-1 and 11A-2 are diagrams illustrating a control example when initial processing is performed, and an example of the change in the size of the virtual object (for example, a guide mark for forward guidance) when the control is performed.

DESCRIPTION OF EMBODIMENTS

The best mode described below is used to facilitate understanding of the present invention. Therefore, those skilled in the art should note that the present invention is not unreasonably limited by the embodiments described below.

First Embodiment

Figure 1A:
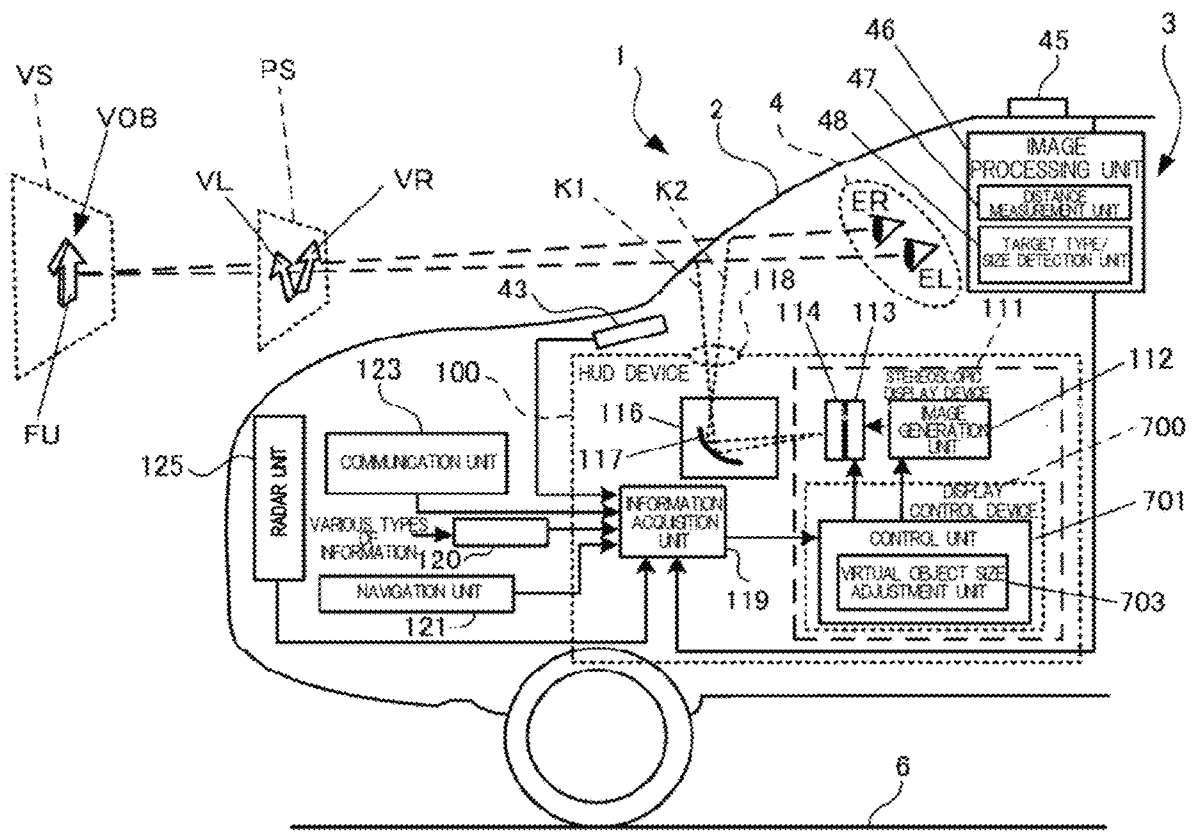
FIG. 1A is a diagram illustrating an example of a configuration of an in-vehicle system including a parallax-type 3D HUD device.
Figure 1B:
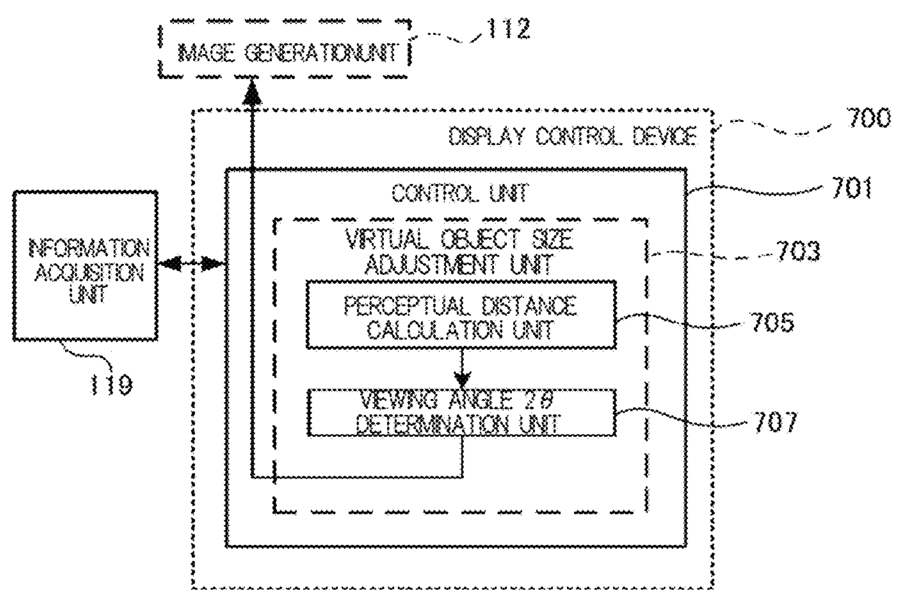
FIG. 1B is a diagram illustrating a preferred configuration example of a control unit.

Refer to FIGS. 1A and 1B. FIG. 1A is a diagram illustrating an example of a configuration of an in-vehicle system including a parallax-type 3D HUD device, and FIG. 1B is a diagram illustrating a preferred configuration example of a control unit.

In FIGS. 1A and 1B, a direction along a line segment connecting left and right eyes EL and ER of a viewer (in other words, a width direction of a vehicle 1) is defined as a left-right direction (or a lateral direction: X direction), a direction along a line segment perpendicular to the left-right direction and perpendicular to the ground or a surface corresponding to the ground (a road surface 6) is defined as an up-down direction (or a height direction: Y direction), and a direction along a line segment perpendicular to both the left-right direction and the up-down direction (a direction in which the vehicle 1 moves forward and backward) is defined as a front-back direction (Z direction). The positive Z direction is a forward direction, and the negative Z direction is a backward direction. This also applies to the other drawings.

An in-vehicle system 3 included in the vehicle (own vehicle) 1 of FIG. 1A has a pupil detection camera 43 for pupil (or face) detection, which detects the eye direction and position of the left eye EL and the right eye ER of the viewer (passenger, driver, or the like in the vehicle 1) 4, a front (broadly, circumference) imaging camera (for example, stereo camera) 45, an image processing unit 46 (including a distance measurement unit 47 and a target type/size detection unit 48), an HUD device 100, a communication unit (having functions such as GPS communication and intervehicle communication) 123, and an ECU 120 capable of collecting various types of information about the vehicle 1 (for example, light on/off information, vehicle speed information, engine information, or the like).

A radar unit 125 or the like as distance measuring means may be further included as needed. The distance measuring means can be used, for example, to measure the distance from the vehicle 1 to a vehicle in front (forward target). On the basis of the measurement result, for example, display control such as performing parallax-type 3D display in a range where there is no forward target can be performed.

The distance measurement unit 47 included in the image processing unit 46 may refer to a pair of left and right original images imaged by, for example, a stereo camera as the imaging camera 45, detect a parallax with respect to the same body (defined as a forward target) by, for example, stereo matching for searching corresponding points of the images, and measure a distance to the forward target by the principle of triangulation based on the parallax.

In addition, the radar unit 125 may emit a radio wave toward a target (forward target) and measure a reflected wave of the radio wave to measure the distance and direction to the target (forward target).

An information acquisition unit 119 of the HUD device 100 appropriately acquires measured distance information or the like and supplies the information to a control unit 701 of a stereoscopic display device 111.

The HUD device 100 is installed in, for example, a dashboard (not illustrated) of the vehicle 1. The HUD device 100 has the stereoscopic display device 111, an optical system 116, a light emission window 118, and the information acquisition unit 119.

The information acquisition unit 119 can acquire various types of information from the communication unit 123, the ECU 120, the radar unit 125, the image processing unit 46, and the like.

Here, the stereoscopic display device 111 is a parallax-type 3D display device. The stereoscopic display device (parallax-type 3D display device) 111 has an image generation unit 112, an image display unit (which is a liquid crystal display device or the like and has an image display surface for displaying an image) 113, a light beam separation unit 114 which has a lenticular lens, a parallax barrier, or the like and separates light emitted from the image display surface into light beams for the left and right eyes, and a display control device 700.

The display control device 700 has the control unit 701. The control unit 701 has a virtual object size adjustment unit 703.

The control unit 701 can control, for example, the operation of the image generation unit (specifically, for example, image rendering) 112 or the image display unit 113, can switch 2D display/3D display, and can also perform visibility control of a content image as a crosstalk countermeasure.

The optical system 116 has a curved mirror (concave mirror or the like) 117 which reflects light from the light beam separation unit 114 and projects display light K1 and K2 of an image onto a windshield (member to be projected) 2. However, other optical members (a lens, an auxiliary reflecting mirror, and the like) may be further included.

In FIG. 1A, viewpoint images having a parallax (also referred to as "parallax images") for the left and right eyes are displayed by the stereoscopic display device 111 of the HUD device 100. As illustrated in FIG. 1A, the respective parallax images are displayed as virtual images VL and VR on a virtual image display surface (imaging surface or adjustment surface) PS as a first display surface.

A stereoscopic image having a sense of depth (stereoscopic image, 3D image) FU is displayed as a virtual object VOB on a congestion surface (stereoscopic image display surface) VS as a second display surface located on the farther side than the first display surface PS as viewed from the viewer 4.

In addition, in the following description, the position of the first display surface PS may be referred to as an "adjustment position." Moreover, with reference to a reference point set on the side of the viewer 4 (here, a viewpoint position of the viewer), a distance to the first display surface PS may be referred to as an "adjustment distance," and a distance to the second display surface VS may be referred to as a "perceptual distance (or congestion distance)" which is a distance at which a stereoscopic image is perceived by the viewer 4.

Furthermore, a distance from the first display surface PS to the second display surface VS may be referred to as a "virtual distance (or depth distance)." The "perceptual distance" can also be referred to as a distance obtained by adding the "virtual distance" to the "adjustment distance."

When 2D display control is executed instead of 3D display control, a planar virtual image is displayed on the first display surface PS.

Refer to FIG. 1B. The virtual object size adjustment unit 703 included in the control unit 701 has a perceptual distance calculation unit 705 and a viewing angle 2θ determination unit 707 that determines a viewing angle 2θ corresponding to the calculated perceptual distance.

Here, the viewing angle 2θ is used as an index for specifying an apparent size of the virtual object VOB as viewed from the viewer 4. This will be described below with reference to FIGS. 6A and 6B.

Refer to FIGS. 2A to 2D. FIGS. 2A to 2D are diagrams illustrating display examples using a virtual object for forward guidance and a virtual object for direction change guidance.

Figure 2A:
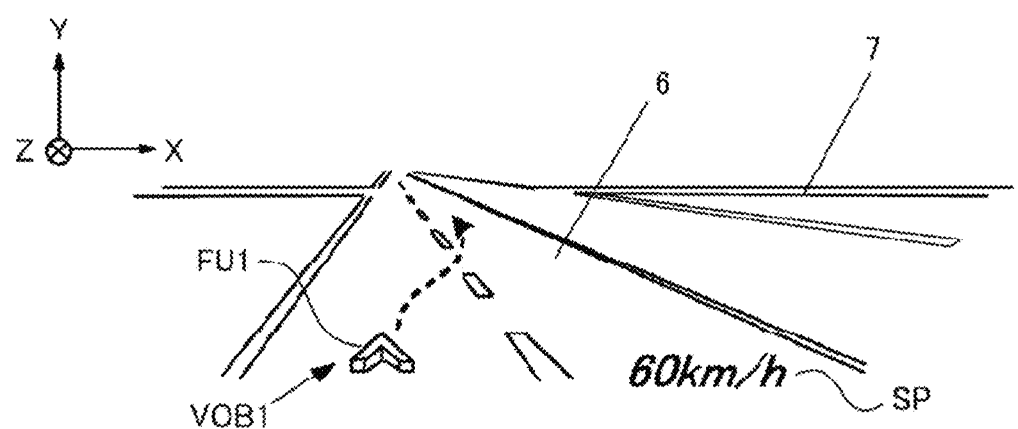
FIGS. 2A to 2D are diagrams illustrating display examples using a virtual object for forward guidance and a virtual object for direction change guidance.

In FIG. 2A, a vehicle speed display (display of "60 km/h") SP and an arrow figure (arrow mark for guidance) FU1 as a virtual object VOB1 for forward guidance, which moves along the road surface 6 of the road are displayed.

The arrow figure FU1 is a type of navigation display that guides the course (route) of the vehicle 1 while moving on the road surface 6. In addition, it can also be said that the arrow figure FU1 is an augmented reality (AR) component of a moving body that moves while changing its position at any time along the road surface 6 so as to be superimposed or to be separated from the road surface 6.

Figure 2B:
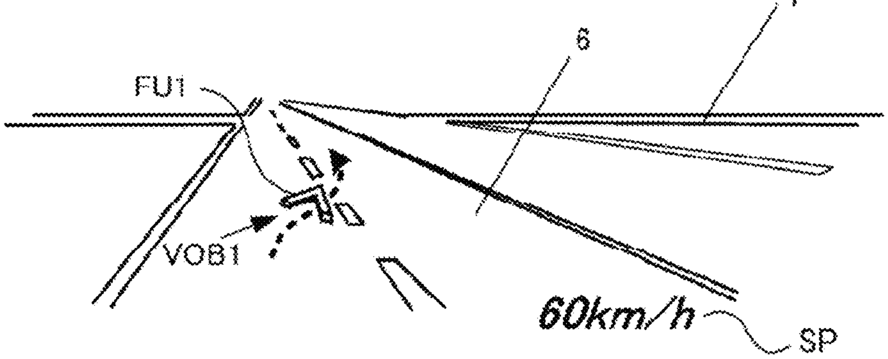
Figure 2C:
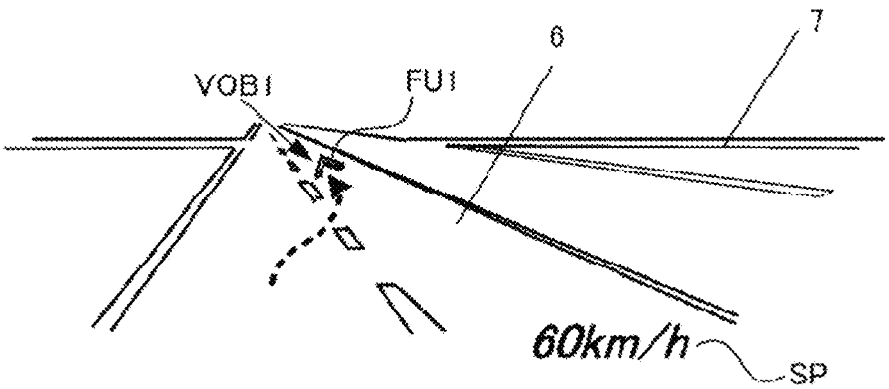

In FIGS. 2A to 2C, the moving route of the arrow figure FU1 is indicated by a dashed arrow.

In FIG. 2B, the arrow figure FU1 changes the moving direction, thereby prompting the vehicle 1 to change a lane.

In FIG. 2C, the arrow figure FU1 approaches a right turn road 7.

Figure 2D:
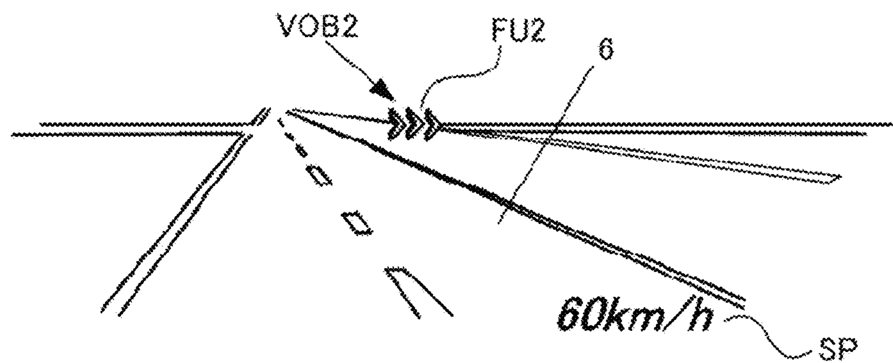

In FIG. 2D, an arrow figure FU2 for direction change (for direction change guidance), which indicates a direction change point, as a virtual object VOB2 is displayed. Specifically, the arrow figure FU2 for direction change is an arrow element for right turn guidance, which prompts a right turn. When FIG. 2C shifts to FIG. 2D, the virtual object VOB1 is switched to the virtual object VOB2.

In the example of FIG. 2D, it can be said that the arrow figure FU2 for direction change is displayed in a size that can be visually recognized by the viewer 4.

Figures 1, 2, 3A:
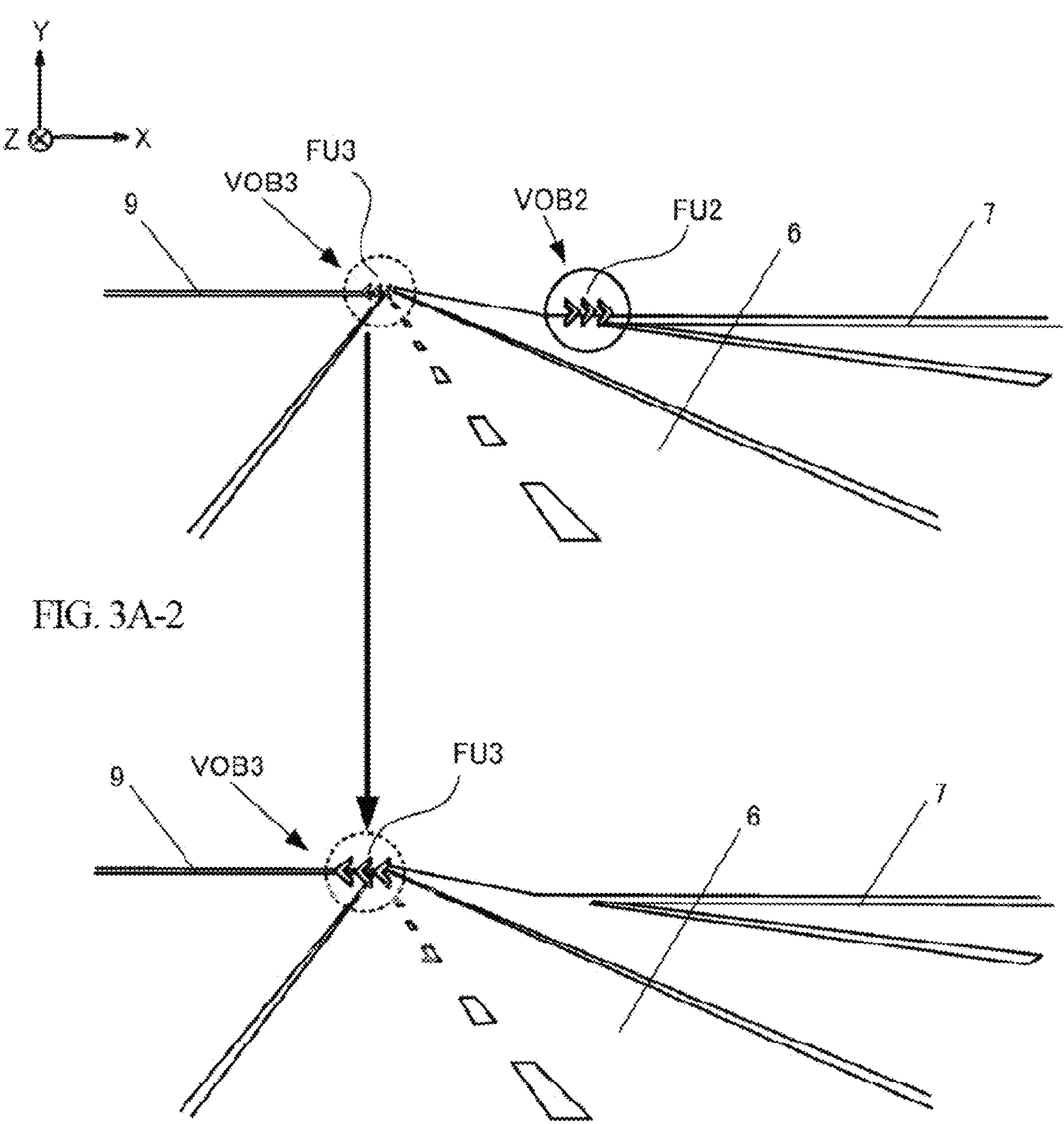
FIGS. 3A-1 and 3A-2 are diagrams illustrating display examples in which a virtual object located on the far side is adjusted to an easily-viewable size when the virtual object is too small.

Next, refer to FIGS. 3A-1 and 3A-2. FIGS. 3A-1 and 3A-2 are diagrams illustrating display examples in which a virtual object located on the far side is adjusted to an easily-viewable size when the virtual object is too small.

In FIG. 3A-1, it is assumed that the direction change point (here, a left turn road 9) is further away from the right turn point illustrated in FIG. 2D. In this case, since an arrow figure FU3 for direction change guidance, which indicates a left turn point (the left turn road 9), as a virtual object VOB3 is located on the far side, the size thereof is considerably small, and it is difficult for the viewer 4 to visually recognize the arrow figure FU3.

In such a case, as illustrated in FIG. 3A-2, the visibility can be improved by adjusting the size of the arrow figure FU3 for direction change guidance to an easily-viewable size.

Figures 1, 4A:
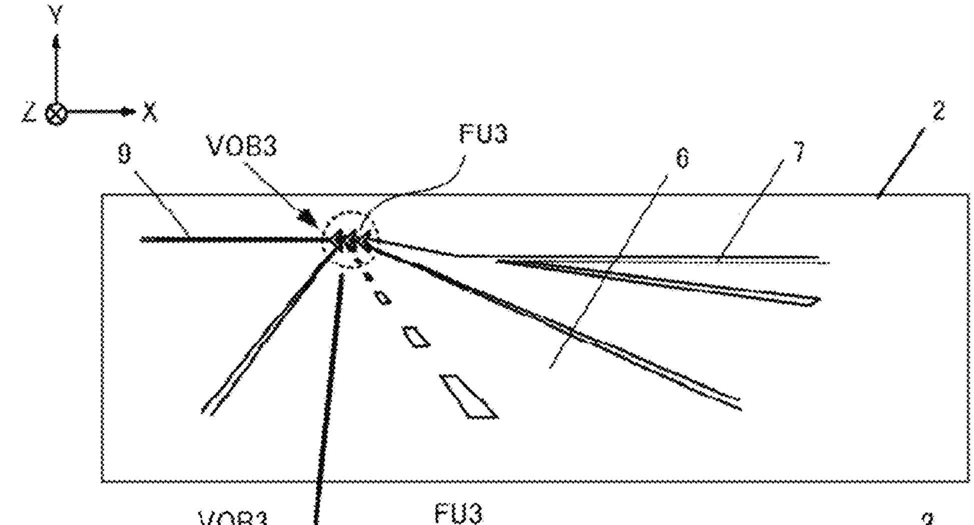
Figures 2, 4A:
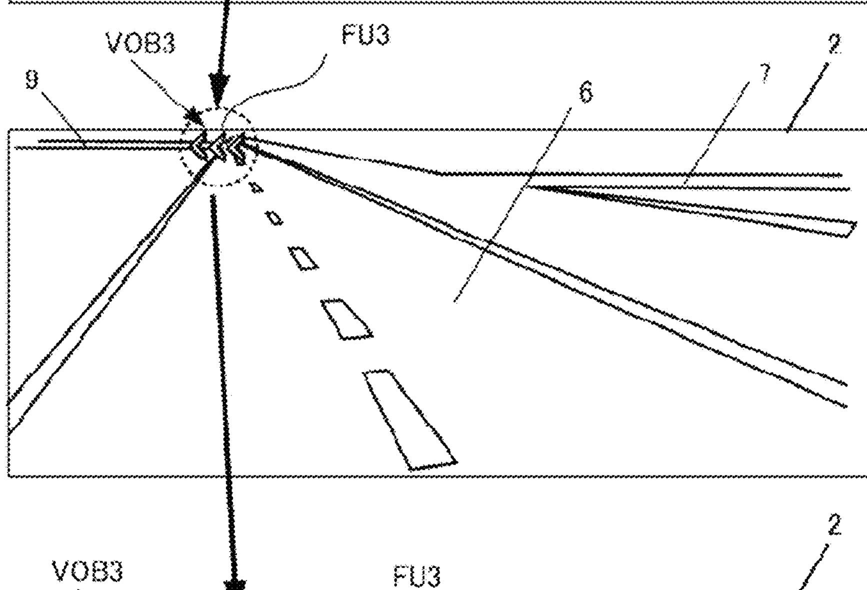
Figures 3, 4A:
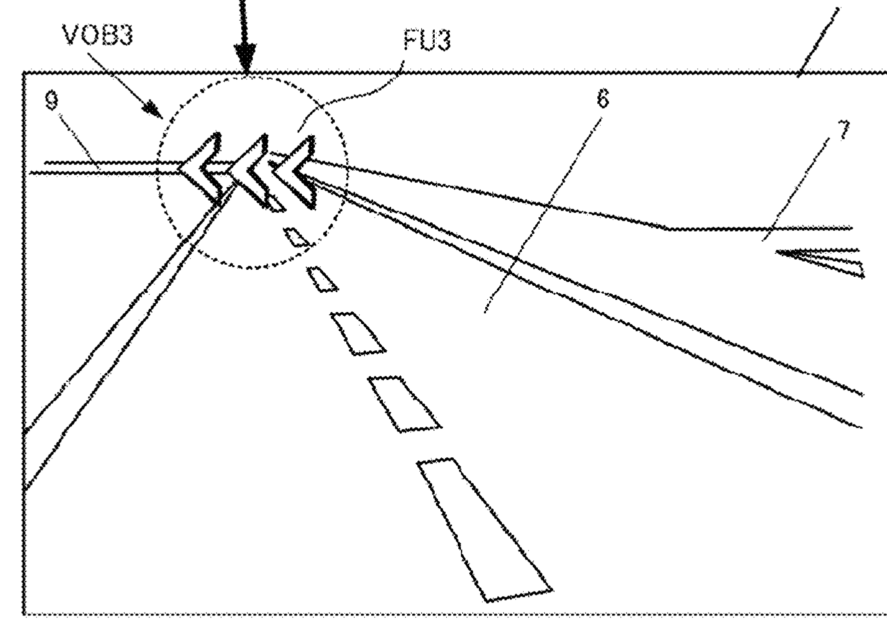

Next, refer to FIGS. 4A-1 to 4A-3. FIGS. 4A-1 to 4A-3 are diagrams illustrating a problem when the size of the virtual object is changed at the same size change rate as that of a real object after the display example of FIG. 3A-2.

FIG. 4A-1 illustrates the arrow figure FU3 for direction change guidance as the virtual object VOB3 in FIG. 3A-2.

It is assumed that, after that, the size of the arrow figure FU3 for direction change guidance as the virtual object VOB3 is changed at the same size change rate as that of a real object.

In FIG. 4A-2, as the vehicle 1 travels forward, the perceptual distance becomes shorter, and the size of the arrow figure FU3 for direction change guidance gradually increases.

In FIG. 4A-3, since the sensitivity of the human eye is sufficiently high in the near region, the size of the arrow figure FU3 for direction change guidance as the virtual object VOB3 suddenly appears to be large, which may cause a sense of discomfort.

Figures 1, 2, 3, 5A:
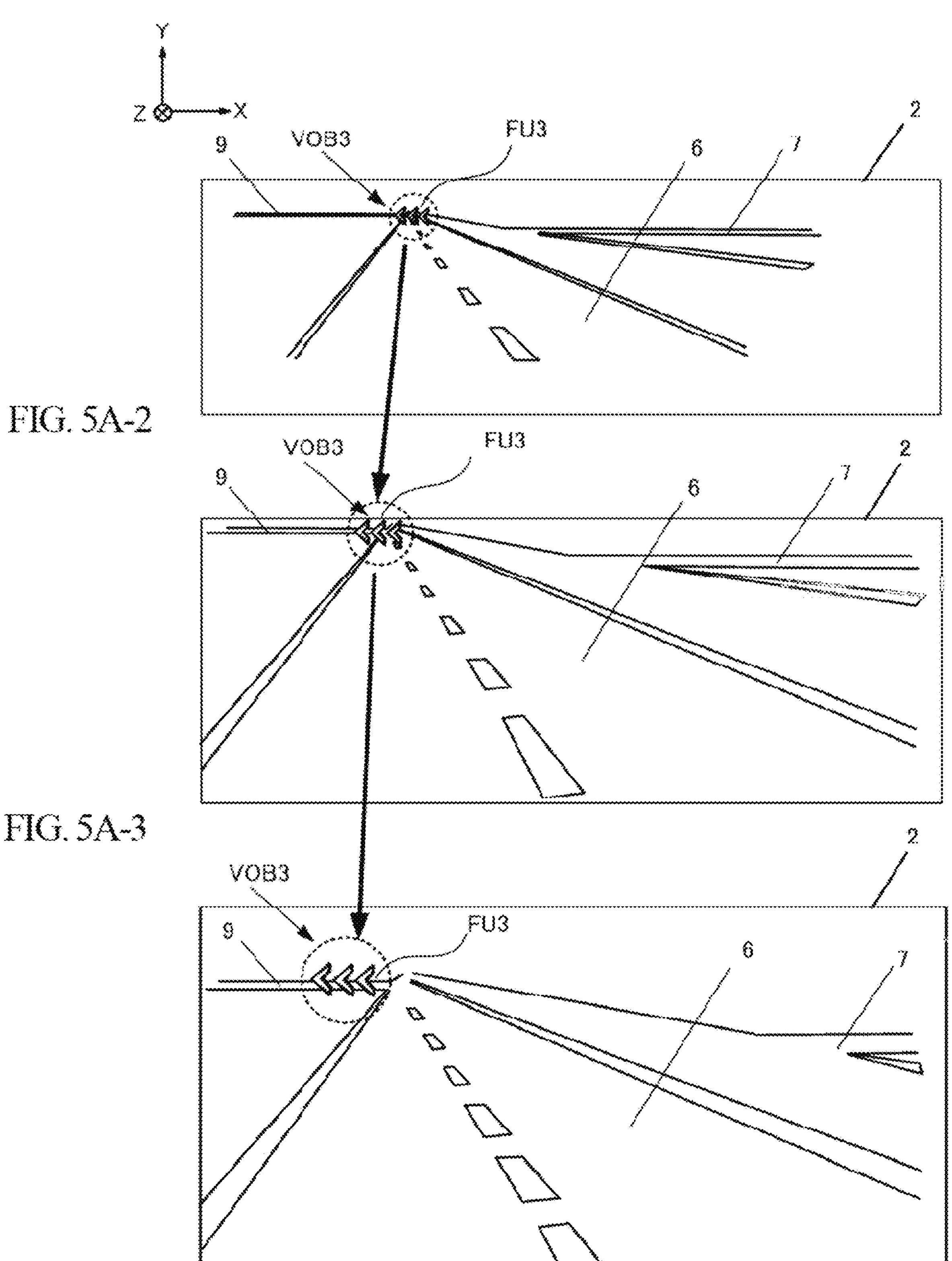

Next, refer to FIGS. 5A-1 to 5A-3. FIGS. 5A-1 to 5A-3 are diagrams illustrating display examples based on size adjustment processing of the virtual object.

FIGS. 5A-1 and 5A-2 are the same as FIGS. 4A-1 and 4A-2.

In FIG. 5A-3, by performing the size adjustment processing of the virtual object, the size of the arrow figure FU3 for direction change guidance as the virtual object VOB3 in the near region is adjusted to an appropriate and easily-viewable size. Therefore, a sense of discomfort is suppressed, and a natural sense of perspective is achieved.

By performing the size adjustment processing in this manner, when the virtual object displayed on the far side viewed from the viewer 4 riding in the vehicle 1 is too small, the visual recognition and the perception of the size change of the virtual object can be prevented from becoming difficult (refer to FIG. 3A-2), while, when the virtual object is displayed on the near side as the vehicle 1 travels, the size of the virtual object can be effectively prevented from becoming too large (refer to FIG. 5A-3).

Figure 6A:
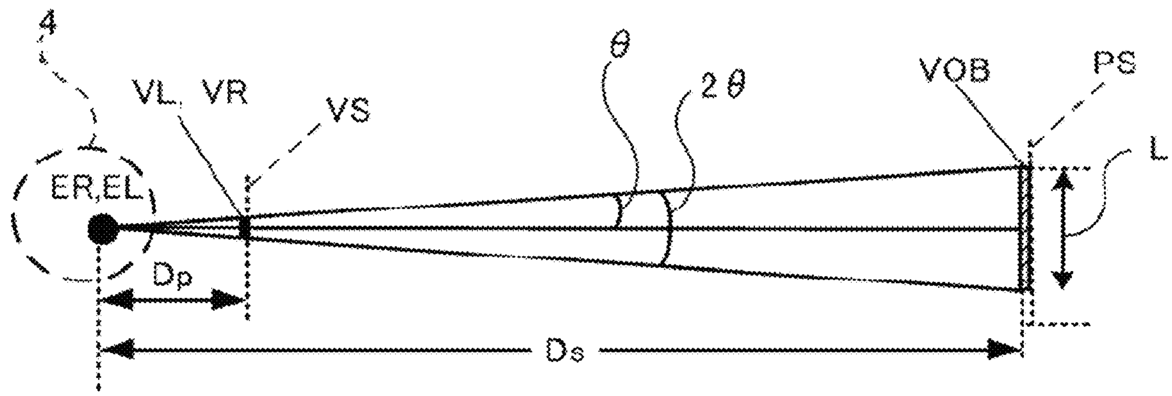
FIGS. 6A and 6B are diagrams illustrating that an apparent size of the virtual object can be determined using a viewing angle 2θ.
Figure 6B:
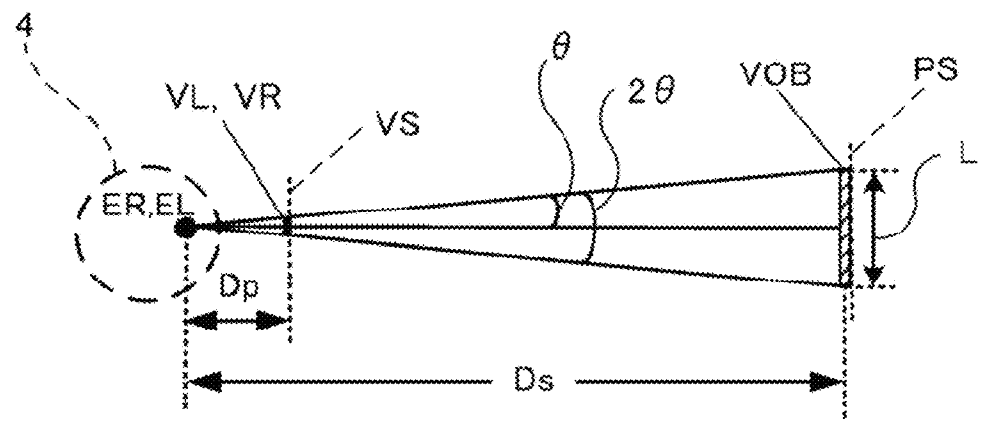

Next, refer to FIGS. 6A and 6B. FIGS. 6A and 6B are diagrams illustrating that the apparent size of the virtual object can be determined using the viewing angle 2θ. In FIGS. 6A and 6B, the same components as those in FIG. 1A are denoted by the same reference numerals.

In FIGS. 6A and 6B, the perceptual distance that is a distance from the viewpoint of the viewer 4 to a predetermined real space position is denoted by Ds, the size of the virtual object VOB at the predetermined real space position is denoted by L, arctangent that is the inverse trigonometric function of tangent is represented as Atan, the function that converts an angle in radians to an angle in degrees is represented as degrees, θ is degrees (Atan (L/2Ds)), 2θ is 2*degrees (Atan (L/2Ds)), and 2θ is the viewing angle.

In FIGS. 6A and 6B, Dp is the adjustment distance that is a distance from the viewpoint of the viewer 4 to the first display surface (virtual image display surface) VS, VL and VR are the virtual images having a parallax for the left and right viewpoints, which are displayed on the first display surface VS, and PS is the second display surface (congestion surface) on which the virtual object VOB is displayed.

In addition, the perceptual distance Ds varies in a range of from 4 m to 50 m, for example. However, this is an example, and the present invention is not limited to this example.

Generally, a range of the perceptual distance from 35 m to 50 m is referred to as a "far side," and a range equal to or less than that is referred to as a "near side." However, this is an example, and the "far side (far region)" and the "near side (near region)" are flexibly interpreted in consideration of various conditions.

For example, in the examples of FIGS. 6A and 6B, the size L of the virtual object VOB is set to, for example, 0.5 m, and there is no difference in the actual size.

However, since the perceptual distance Ds is shorter in FIG. 6B than in FIG. 6A, the apparent size of the virtual object VOB that the viewer 4 perceives is larger in FIG. 6B.

As can be seen from FIGS. 6A and 6B, the viewing angle 2θ corresponds to the size L of the virtual object VOB, and the viewing angle 2θ increases as the perceptual distance Ds becomes shorter.

Figures 1, 2, 7A:
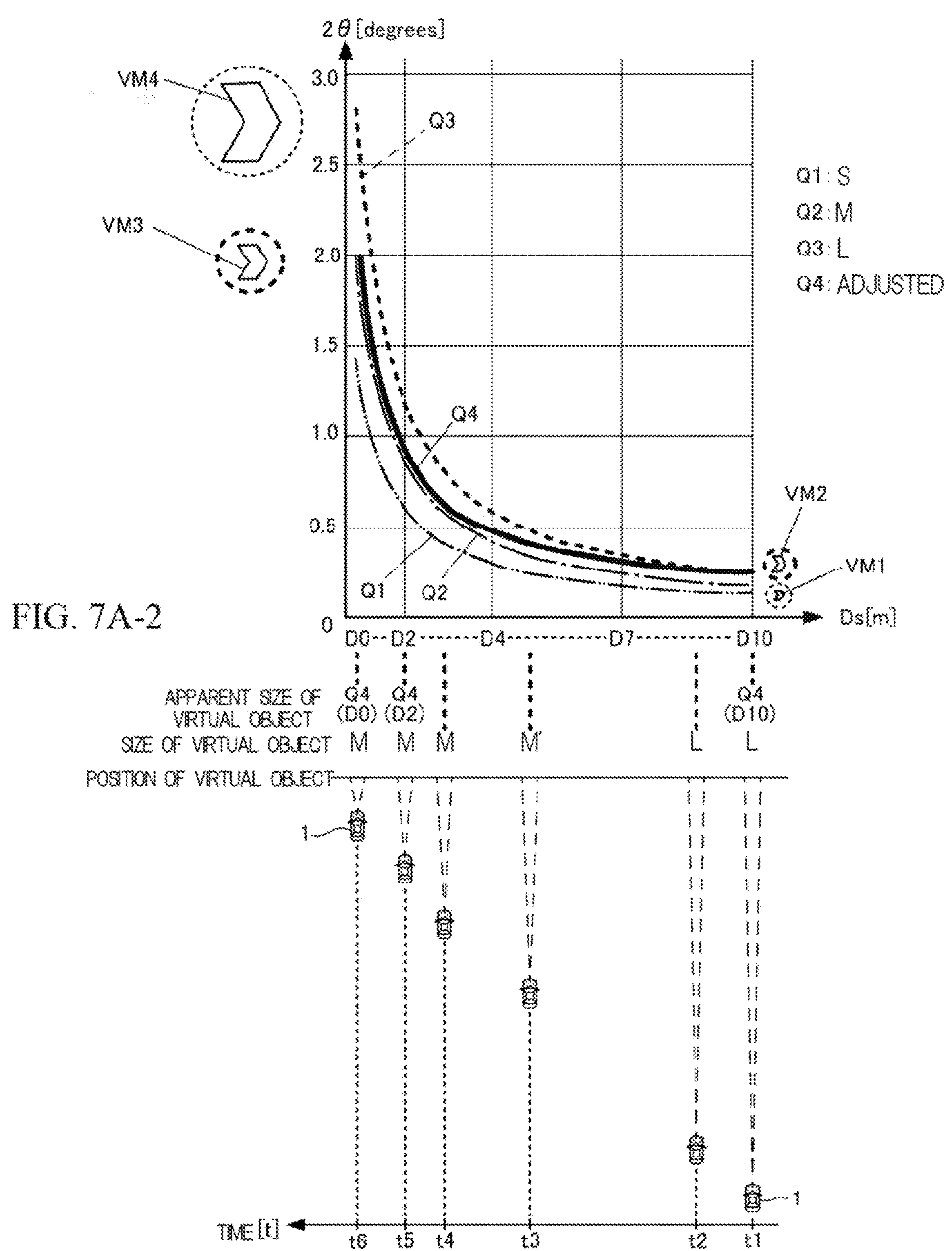

The degree of change (change rate) of the viewing angle 2θ with respect to the perceptual distance is similar to (the same as) the change rate indicated by a characteristic line Q1 (Q2, Q3) in FIG. 7A-1, for example.

Thus, the viewing angle 2θ can be used as an index for indicating the apparent size of the virtual object VOB that the viewer 4 perceives.

Therefore, the viewing angle 2θ corresponding to the perceptual distance Ds can be specified on the basis of the function (characteristic line) indicating a relationship between the perceptual distance Ds and the viewing angle 2θ, and the size of the virtual object VOB can be variably controlled on the basis of the specified viewing angle 2θ.

For example, the size and the position of the virtual object VOB can be changed by appropriately changing the size (and the display position) and the like of the virtual images VL and VR on the first display surface (virtual image display surface) VS.

First, the perceptual distance calculation unit 705 of the control unit 701 illustrated in FIG. 1B calculates the perceptual distance Ds, the viewing angle 2θ determination unit 707 determines (calculates or the like) the viewing angle 2θ corresponding to the calculated perceptual distance Ds, and information of the obtained viewing angle 2θ is supplied to the image generation unit 112, so that the above display processing can be achieved at high speed.

Next, refer to FIGS. 7A-1 and 7A-2. FIGS. 7A-1 and 7A-2 are diagrams illustrating an example of control when the size of the virtual object is controlled using a function that associates the viewing angle 2θ with a distance from a viewer to a predetermined real space position (perceptual distance), and an example of a change in the size of the virtual object when the control is performed.

In FIG. 7A-1, four characteristic lines (functions) Q1 to Q4 are illustrated.

The characteristic line Q1 indicated by a dash-dot-dot line is a characteristic line (characteristic line in the case of the size "small") indicating the size change rate (real world size change rate) corresponding to the real object existing in the real space when the size L of the virtual object VOB (refer to FIGS. 6A and 6B) is set to "0.05 [m]" as an example.

The characteristic line Q2 indicated by a dash-dot line is a characteristic line (characteristic line in the case of the size "medium") indicating the size change rate (real world size change rate) corresponding to the real object existing in the real space when the size L of the virtual object VOB (refer to FIGS. 6A and 6B) is set to "0.07 [m]" as an example.

The characteristic line Q3 indicated by a dashed line is a characteristic line (characteristic line in the case of the size "large") indicating the size change rate (real world size change rate) corresponding to the real object existing in the real space when the size L of the virtual object VOB (refer to FIGS. 6A and 6B) is set to "0.1 [m]" as an example.

The characteristic line Q4 indicated by a solid line is a characteristic line (adjusted characteristic line) used for the size adjustment processing.

In addition, in FIG. 7A-1, for example, D10 indicates the perceptual distance when the distance between the viewer 4 to the predetermined real space position is the farthest (when the predetermined real space position is located on the farthest side), and D0 indicates the perceptual distance when the distance is the shortest (when the viewer 4 is the closest to the predetermined real space position).

The sensitivity of the human eye is low in the far region and is sufficiently high in the near region. Thus, for example, in the characteristic lines Q1 to Q3, the change rate of the viewing angle 2θ with respect to the perceptual distance Ds is small (gradual change) in the range of the perceptual distance from D10 to D4, but the change rate increases rapidly (rapid change) in the range of the perceptual distance from D4 to D0.

As illustrated on the lower right side of FIG. 7A-1, at the perceptual distance D10, when the apparent size of the virtual object VOB is VM1, VM1 is too small to be visually recognized, and thus, the size of the virtual object VOB is adjusted such that the apparent size becomes relatively easily-viewable VM2.

When the apparent size of the virtual object VOB is set to VM2 at the perceptual distance D10, the apparent size VM2 corresponds to the apparent size at the perceptual distance D10 on the characteristic line Q3 of the size "large" indicated by the dashed line.

Therefore, when the size of the virtual object VOB is to be changed at the same change rate as the real object, the characteristic line Q3 is selected.

However, when the size of the virtual object VOB is changed in accordance with the characteristic line Q3, as illustrated in the upper left of FIG. 7A-1, the apparent size of the virtual object VOB when the perceptual distance is D0 becomes VM4, and the size becomes too large, which causes a sense of discomfort.

Therefore, in FIG. 7A-1, the size adjustment processing is performed using the adjusted characteristic line (function) Q4 indicated by the solid line, and the size of the virtual object VOB is variably controlled while being adjusted to an appropriate size.

In other words, in the example of FIGS. 7A-1 and 7A-2, the "size adjustment processing" of adjusting the size of the virtual object VOB is performed in a period in which the vehicle 1 is approaching the predetermined real space position.

In the "size adjustment processing," in at least a part of the period in which the vehicle 1 is approaching the predetermined real space position, processing of setting the change rate of the size of the virtual object VOB with respect to the perceptual distance, in other words, the degree of the size change with respect to the distance between the viewer 4 and the real space position (perceptual distance) when the size of the virtual object gradually increases, to be smaller than the size change rate of the real object is performed. Accordingly, the size of the virtual object VOB in the near region as viewed from the viewer can be prevented from becoming too large.

In the example of FIG. 7A-1, the size adjustment processing using the adjusted characteristic line Q4 indicated by the solid line is performed, the apparent size of the virtual object VOB becomes VM3 in the vicinity of the perceptual distance D0, and a size that is not too large and is easily viewable is achieved.

In this manner, in the example of FIGS. 7A-1 and 7A-2, the size of the virtual object VOB can be controlled to an appropriate size from the far region to the near region, and improvement in viewability, suppression of a sense of discomfort, and the like can be achieved.

Next, main features of the adjusted characteristic line Q4 of FIG. 7A-1 will be described. In the range of the perceptual distance from D10 to D4, the size change rate of the adjusted characteristic line Q4 indicated by the solid line is suppressed to be smaller than the size change rate of the characteristic line Q3 indicated by the dashed line.

This size suppression enables the apparent size of the virtual object VOB in the vicinity of the perceptual distance D0 to be the size VM3 that is not too large.

Moreover, in the range of the perceptual distance from D4 to D0, the size change rate of the adjusted characteristic line Q4 is set to a change rate that is substantially similar to (the same as) that of the characteristic line Q3 or the characteristic line Q2.

In other words, for the sake of convenience, when a period in which the apparent size of the virtual object VOB is changed from the apparent first size VM2 at the perceptual distance D10 to the apparent second size VM3 at the perceptual distance D0 (a period from time t1 to t6 in FIG. 7A-2) is divided into a far period in which the vehicle 1 is located relatively far from the predetermined real space position and a near period in which the vehicle 1 is located relatively near the predetermined real space position, the control unit 701 sets the size change rate of the virtual object VOB to be substantially similar to (the same as) the size change rate of the real object in the near period (a period from around time t4 to around time t6 in FIG. 7A-2).

By setting the size change rate of the virtual object VOB to be the same as the size change rate of the real object in the near region viewed from the viewer 4, a natural sense of perspective similar to the sense of perspective of the real object in the real space can be generated in the virtual object VOB. This contributes to a reduction in a sense of discomfort.

Refer to FIG. 7A-2. FIG. 7A-2 illustrates an example of, in the case where the size adjustment of the virtual object VOB based on the adjusted characteristic line Q4 is performed in FIG. 7A-1, a change in the distance between the position of the vehicle 1 and the position of the virtual object (perceptual distance) when the apparent size of the virtual object VOB gradually increases with the passage of time.

In the example of FIG. 7A-2, the apparent size of the virtual object VOB changes in accordance with the viewing angle 2θ on the characteristic line Q4 corresponding to the perceptual distance Ds (=Q4 (Ds)) at each of times t1 to t6. In other words, when a function on the characteristic line Q4 is referred to as Q4 (Ds), the apparent size of the virtual object VOB changes to Q4 (Ds (t1))=Q4 (D10), Q4 (Ds (t2)), Q4 (Ds (t3)), Q4 (Ds (t4)), Q4 (Ds (t5))=Q4 (D2), Q4 (Ds (t6))=Q4 (D0) at each of times t1 to t6. Time t1 corresponds to the perceptual distance D10, time t5 corresponds to the perceptual distance D2, and time t6 corresponds to the perceptual distance D0. In addition, the size of the virtual object VOB changes, as a value of time t, L (t1), L (t2), L (t3), L (t4), L (t5), and L (t6), in other words, approximately, size large, size large, size medium' (size medium'≥size medium), size medium, size medium, and size medium at each of times t1 to t6.

In this manner, in the example of FIGS. 7A-1 and 7A-2, the size of the virtual object VOB can be controlled to an appropriate size from the far region to the near region, and improvement in viewability, suppression of a sense of discomfort, and the like can be achieved.

Second Embodiment

Figures 1, 2, 8A:
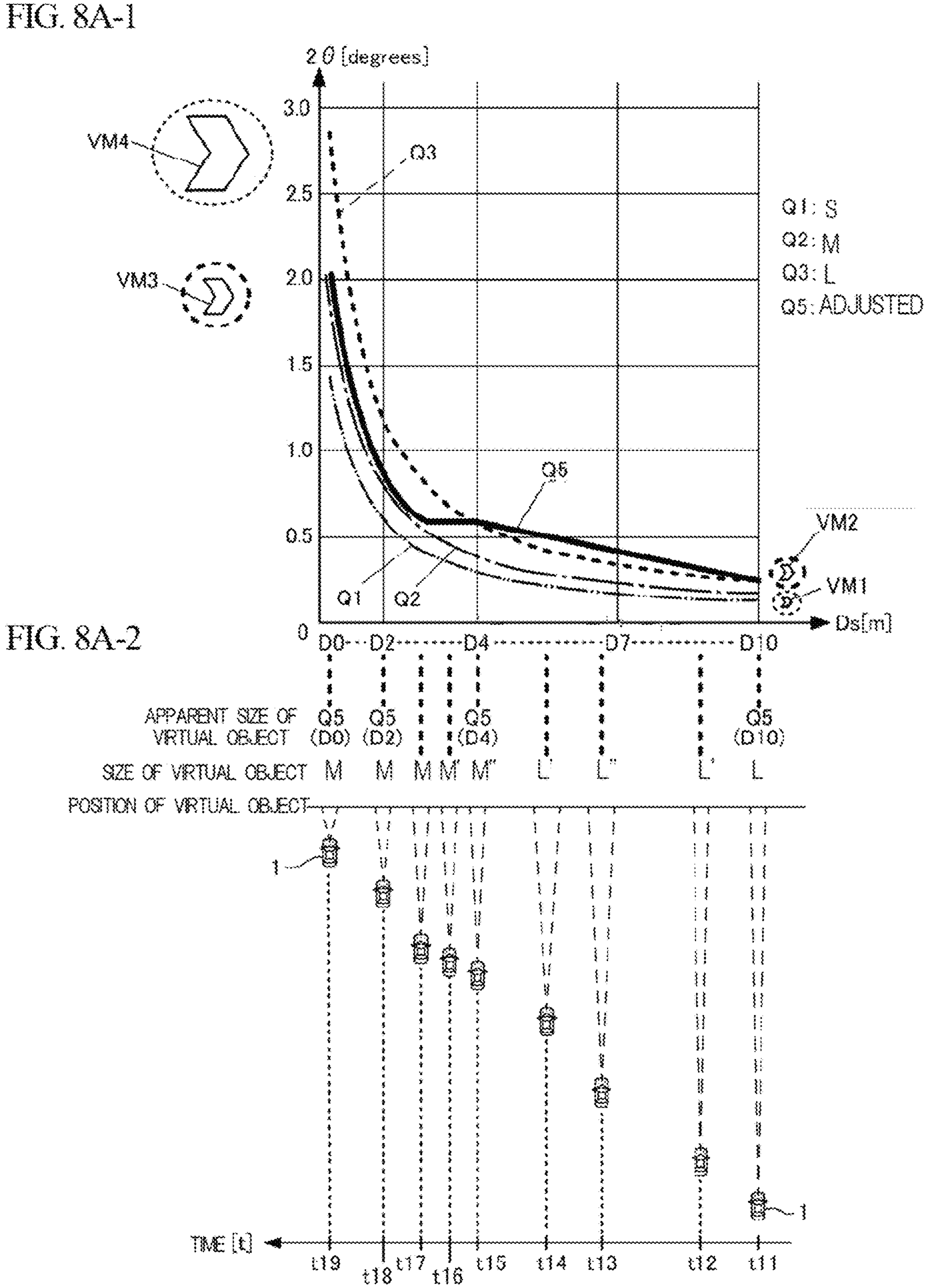

Refer to FIG. 8A-1. In the example of FIG. 8A-1, the size adjustment processing is performed using an adjusted characteristic line (function) Q5.

In the example of FIG. 8A-1, for the sake of convenience, a section from the perceptual distance D10 to D4 (a period from time t11 to t15 of FIG. 8A-2) is referred to as the far region, and a section from the perceptual distance D4 to D0 (a period from time t15 to t19 of FIG. 8A-2) is referred to as the near region.

In FIG. 8A-1, the size change rate of the virtual object VOB with respect to the distance (perceptual distance) in the far region (the section from the perceptual distance D10 to D4) is set to be larger than the size change rate of the real object with respect to the distance (characteristic line Q3) to emphasize the change, and thus it becomes easy to grasp a sense of perspective. In other words, the viewer 4 can easily perceive the approach of the virtual object VOB even in the far region.

The real object in the real space has a considerably small size change rate with respect to the distance change in the far region, and therefore, when the size control is performed in accordance with the real object, the virtual object VOB may be perceived as if the virtual object VOB did not approach the predetermined real space position.

In the example of FIGS. 8A-1 and 8A-2, even in the far region, the viewer 4 can easily perceive the size change of the virtual object VOB (in other words, the change in a sense of perspective) as the vehicle 1 travels. In other words, for example, the viewer 4 can easily intuitively recognize that the vehicle 1 is approaching the direction change point or the like.

In the example of FIG. 8A-2, the apparent size of the virtual object VOB changes to, in accordance with the viewing angle 2θ on the characteristic line Q5 corresponding to the perceptual distance, in other words, Q5 (Ds (t11))=Q5 (D10), Q5 (Ds (t12)), Q5 (Ds (t13)), Q5 (Ds (t14)), Q5 (Ds (t15))=Q5 (D4), Q5 (Ds (t16)), Q5 (Ds (t17)), Q5 (Ds (t18)), Q5 (Ds (t19))=Q5 (D0) at each of times t11 to t19. Time t11 corresponds to the perceptual distance D10, time t15 corresponds to the perceptual distance D4, and time t19 corresponds to the perceptual distance D0. In addition, the size of the virtual object VOB changes to L (t11), L (t12), L (t13), L (t14), L (t15), L (t16), L (t17), L (t18), and L (t19), in other words, approximately, size large, size large', size large" (size large"≥size large'≥size large), size large', size medium" (size medium"≥size medium'≥size medium), size medium', size medium, size medium, and size medium at each of times t11 to t19.

In this manner, in the example of FIGS. 8A-1 and 8A-2, the size of the virtual object VOB can be controlled to an appropriate size from the far region to the near region, in particular, improvement in visibility in the far region can be achieved, and improvement in viewability, suppression of a sense of discomfort, and the like can be achieved.

Third Embodiment

Figure 9:
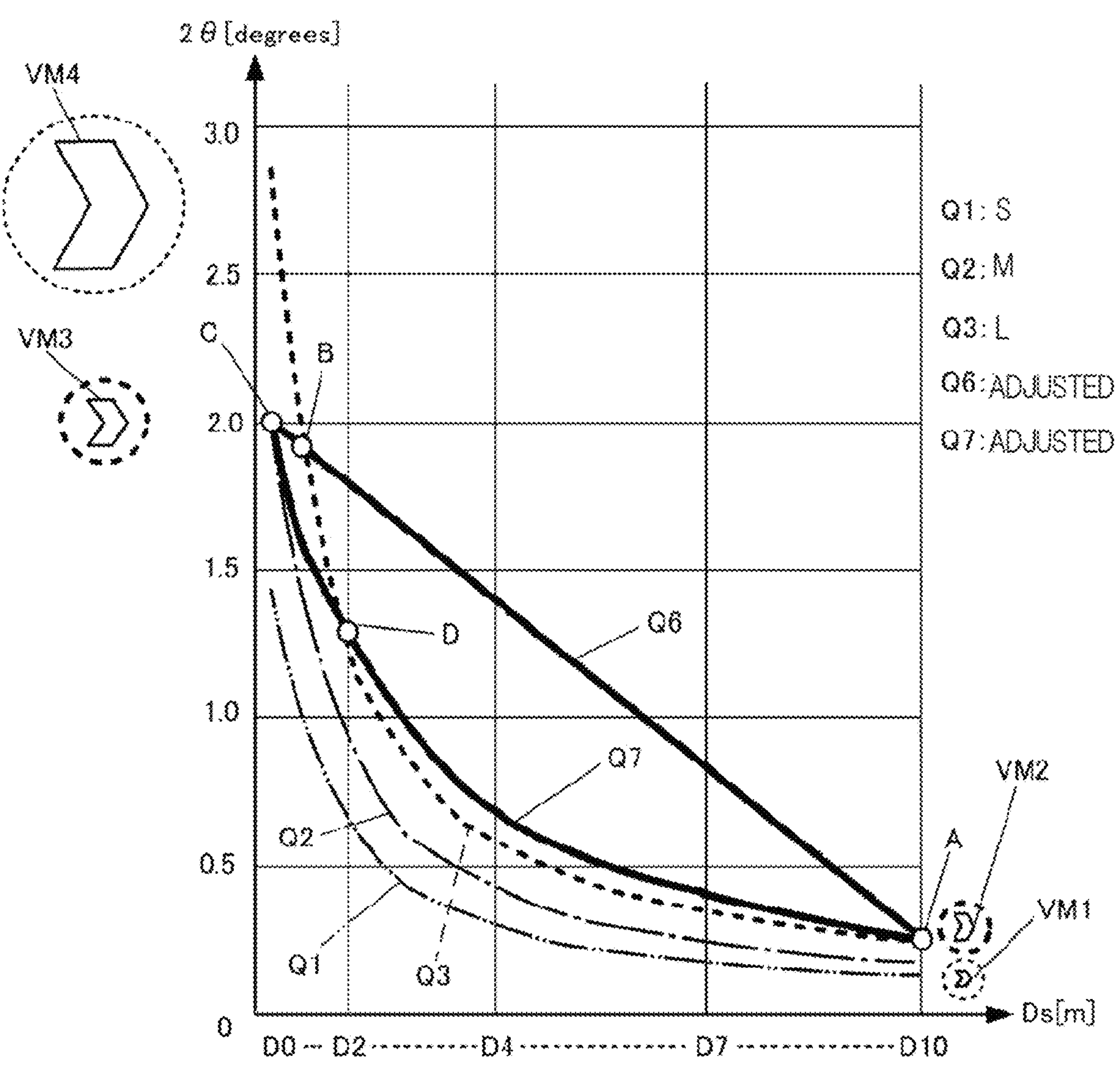
FIG. 9 is a diagram illustrating still another example of the control when the size of the virtual object is controlled using the function that associates the viewing angle 2θ with the distance from the viewer to the predetermined real space position (perceptual distance), and still another example of the change in the size of the virtual object when the control is performed.

Refer to FIG. 9. In the example of FIG. 9, the size adjustment processing is performed using an adjusted characteristic line (function) Q6 or Q7. Similarly to the example of FIGS. 8A-1 and 8A-2 described above, also in the present embodiment, the size change of the virtual object in the far region is emphasized. The example of FIG. 9 has a higher degree of emphasis than the example of FIGS. 8A-1 and 8A-2.

In FIG. 9, a portion from point A to point B of the characteristic line Q6 is a portion corresponding to the far region, and a portion from point B to point C is a portion corresponding to the near region.

In addition, a portion from point A to point D of the characteristic line Q7 is a portion corresponding to the far region, and a portion from point D to point C is a portion corresponding to the near region.

In the example of FIG. 9, the size change rate of the virtual object VOB with respect to the distance (perceptual distance) in the far region is set to be larger than the size change rate of the real object with respect to the distance (characteristic line Q3) to further emphasize the change, and thus it becomes easier to grasp a sense of perspective.

In other words, the viewer 4 can more easily perceive the approach of the virtual object VOB even in the far region.

Fourth Embodiment

Figures 1, 2, 10A:
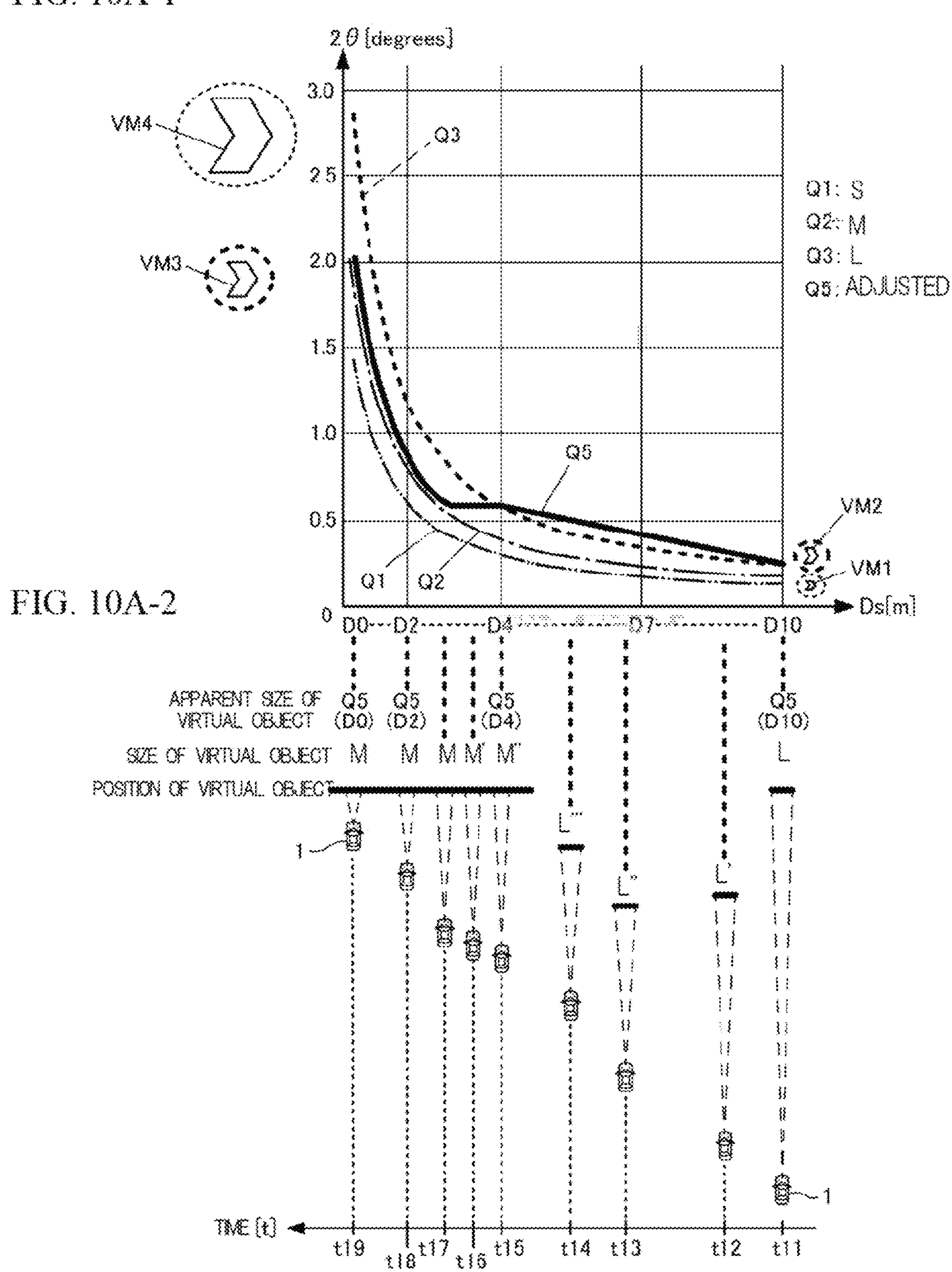

Refer to FIGS. 10A-1 and 10A-2. FIGS. 10A-1 and 10A-2 are diagrams illustrating a control example when size adjustment of the virtual object is achieved by variably controlling the distance from the viewer to the predetermined real space position (perceptual distance), and an example of the change in the apparent size of the virtual object when the control is performed.

FIG. 10A-1 is the same as FIG. 8A-1 described above. In addition, the change in the size of the virtual object VOB corresponding to times t11 to t19 in FIG. 10A-2 is also the same as that in FIG. 8A-2, and the size of the virtual object VOB changes to L (t11), L (t12), L (t13), L (t14), L (t15), L (t16), L (t17), L (t18), and L (t19), in other words, approximately, size large, size large', size large" (size large"≥ size large'≥size large), size large', size medium" (size medium"≥ size medium'≥size medium), size medium', size medium, size medium, and size medium at each of times t11 to t19.

However, in FIG. 10A-2, the size adjustment is achieved by variably controlling the distance from the viewer 4 to the predetermined real space position (perceptual distance) at times t12 to t14. The apparent size of the virtual object VOB changes to Q5 (Ds (t12) after the change), Q5 (Ds (t13) after the change), and Q5 (Ds (t14) after the change) at each of times t12 to t14, and the same effect as in the example of FIGS. 8A-1 and 8A-2 is obtained also by changing the position at which the virtual object VOB is displayed as illustrated in FIG. 10A-2.

Fifth Embodiment

Figures 1, 2, 11A:
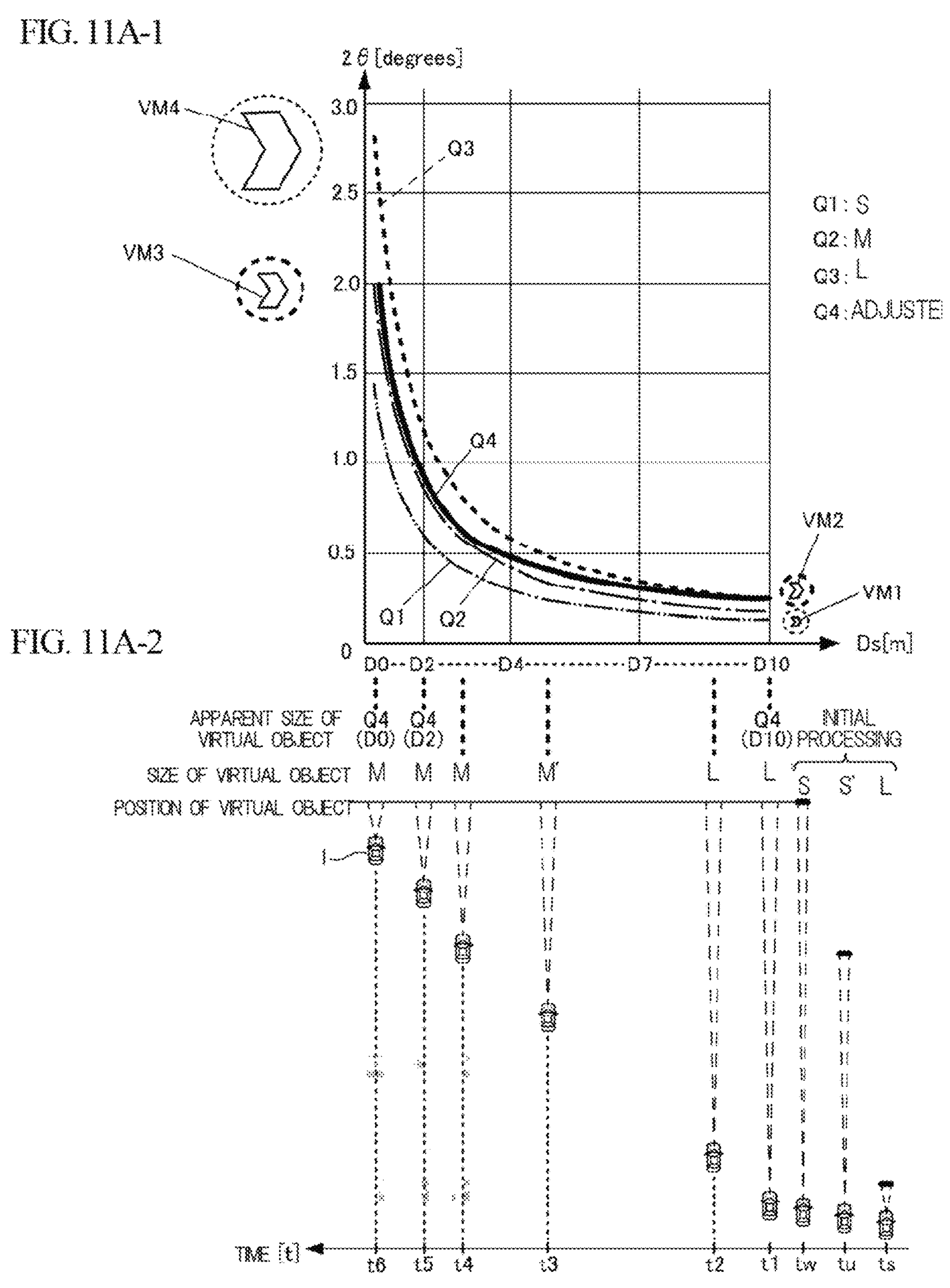

Refer to FIGS. 11A-1 and 11A-2. FIGS. 11A-1 and 11A-2 are diagrams illustrating a control example when initial processing is performed, and an example of the change in the size of the virtual object (for example, a guide mark for forward guidance) when the control is performed.

FIG. 11A-1 is the same as FIG. 7A-1 described above. The change in the size of the virtual object VOB and the change in the apparent size of the virtual object VOB at times t1 to t6 in FIG. 11A-2 are also the same as those in FIG. 7A-2.

However, in FIG. 11A-2, the initial processing is performed in a period from time ts to tw before time t1.

In the initial processing in FIG. 11A-2, prior to the size adjustment processing, the virtual object (for example, the above arrow figure FU1 illustrated in FIGS. 2A to 2C) VOB for forward guidance is moved from the near region to the far predetermined real space position as viewed from the viewer 4, and guidance of a traveling route or the like of the vehicle 1 is performed.

At this time, the size change rate of the virtual object VOB for forward guidance with respect to the perceptual distance (the distance from the viewer 4 to the predetermined real space position) can be adjusted to be the same as the size change rate of the real object in the real space. Such display processing is referred to as "initial processing."

At times ts to tw, the size of the virtual object VOB for forward guidance changes to size large, size small', and size small. The size may be fixed to size small at times ts to tw.

The viewer 4 can roughly perceive the distance to the predetermined real space position (for example, a direction change position of the vehicle) and can feel a sense of security by the initial processing.

When the virtual object VOB for forward guidance reaches the predetermined real space position, even if the size thereof is too small to be viewed, as described above, for example, the virtual object VOB for direction change guidance is displayed in an easily-viewable size by the size adjustment processing, and the visibility is improved.

Moreover, thereafter, in a process in which the vehicle 1 is approaching the predetermined real space position, appropriate size adjustment is performed by the above size adjustment processing, so that an appropriate sense of perspective can be given to the virtual object VOB for direction change guidance, and a sense of discomfort is suppressed. Therefore, it becomes possible to display an easily-viewable image for guidance (navigation image) with little sense of discomfort.

Sixth Embodiment

Figure 12:
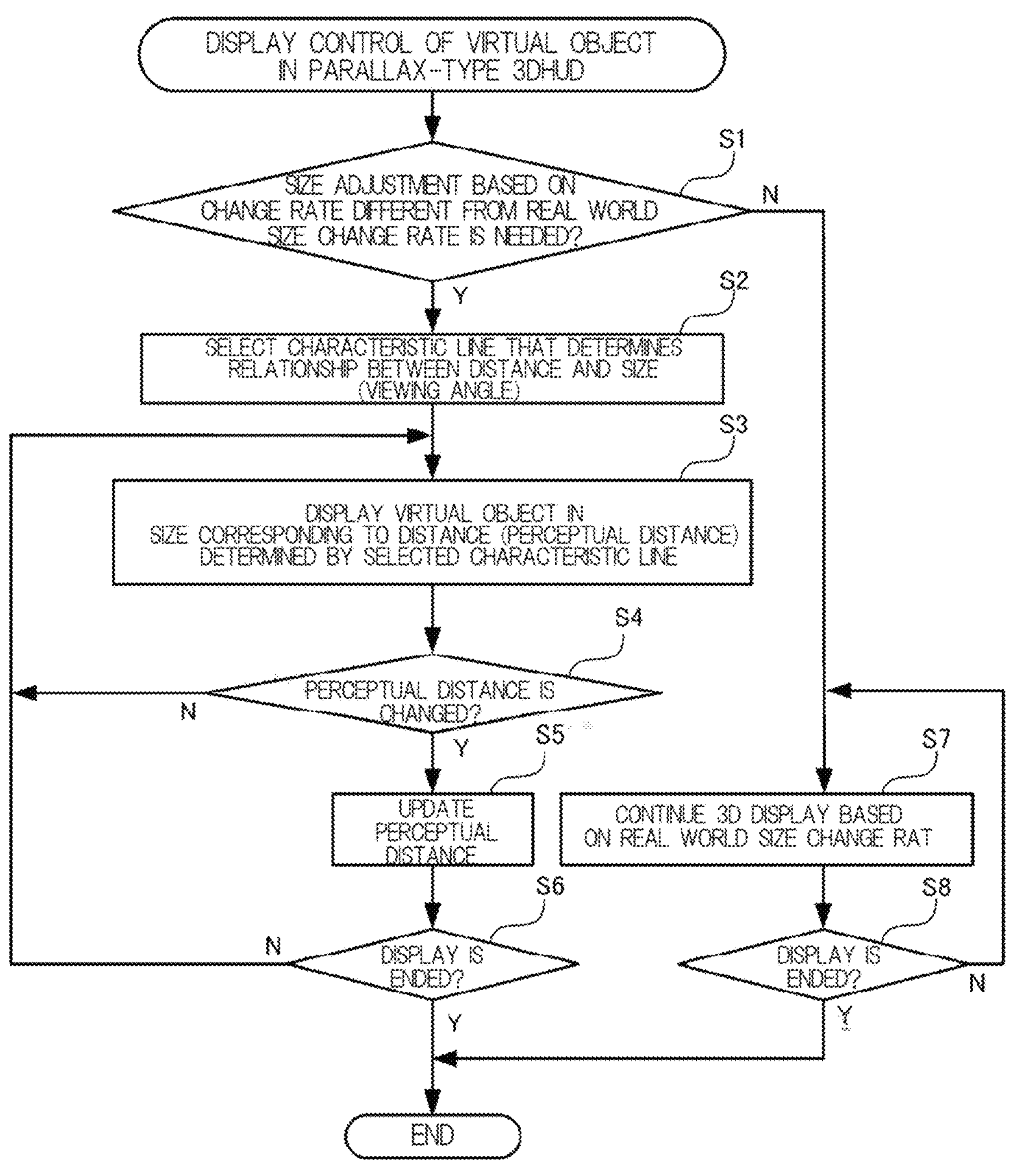
FIG. 12 is a flowchart illustrating a procedure example of display control of the virtual object.

Next, refer to FIG. 12. FIG. 12 is a flowchart illustrating a procedure example of display control of the virtual object.

In step S1, whether the size adjustment based on the change rate different from the real world size change rate is needed for the apparent size of the virtual object is determined.

The "real world size change rate" is, when the virtual object is assumed to be the real object in the real space, a size change rate of the real object with respect to the distance.

In step S1, in the case of Y, the processing proceeds to step S2, and in the case of N, the processing proceeds to step S7.

In step S2, the characteristic line (function) that determines the relationship between the distance (perceptual distance) and the size (viewing angle) is selected.

In step S3, the virtual object is displayed in a size corresponding to the distance (perceptual distance) determined by the selected characteristic line (function).

In step S4, whether the distance (perceptual distance) is changed is determined. In the case of Y, the processing proceeds to step S5, and in the case of N, the processing returns to step S3.

In step S5, the distance (perceptual distance) is updated.

In step S6, whether the display is ended is determined. In the case of Y, the display is ended, and in the case of N, the processing returns to step S3.

Moreover, in step S7, the display (3D display) based on the real world size change rate is continued.

In step S8, whether the display is ended is determined. In the case of Y, the display is ended, and in the case of N, the processing returns to step S7.

As described above, according to the present invention, when the virtual object displayed on the far side viewed from the viewer riding in the vehicle is too small, the visual recognition and the perception of the size change of the virtual object can be prevented from becoming difficult, while, when the virtual object is displayed on the near side as the vehicle travels, the size of the virtual object can be prevented from becoming too large.

The present invention is not limited to the above-described embodiments, and various modifications can be made. For example, in the above-described embodiments, the parallax-type 3D has been described as an example, but the present invention can also be applied to a case where images for the left and right viewpoints are displayed in 2D as images without a parallax.

In the present description, the term "vehicle" can also be interpreted broadly as a conveyance. Moreover, the terms related to navigation (for example, a sign and the like) are interpreted broadly in consideration of, for example, the viewpoint of navigation information useful for vehicle operation in a broad sense.

Furthermore, the HUD device and the indicator device (and the display device in a broad sense) include a device used as a simulator (for example, an aircraft simulator, a simulator as a game device, and the like).

The present invention is not limited to the above-described exemplary embodiments, and those skilled in the art can easily modify the above-described exemplary embodiments to the extent that the above-described exemplary embodiments are included in the scope of the claims.

REFERENCE SIGNS LIST

1 vehicle (own vehicle)
2 windshield (member to be projected)
3 in-vehicle system
4 viewer (passenger, driver)
6 road surface
43 pupil detection camera
45 circumference imaging camera
46 image processing unit
47 distance measurement unit
48 target type/size detection unit
100 HUD device
111 stereoscopic display device
112 image generation unit
113 display unit (display panel or the like)
114 light beam separation unit (lenticular lens, parallax barrier, or the like)
116 optical system
117 curved mirror (concave mirror or the like)
118 light emission window
119 information acquisition unit
120 ECU
121 navigation unit
123 communication unit
125 radar unit
700 display control device (processor or the like)
701 control unit
703 virtual object size adjustment unit
705 perceptual distance calculation unit
707 viewing angle 2θ determination unit
K1, K2 display light
PS first display surface (virtual image display surface)
VS second display surface (congestion surface)
2θ viewing angle

The invention claimed is:

1. A display control device installed in a vehicle, comprising:

a control unit that executes display control when a virtual object is displayed such that a viewer riding in the vehicle can visually recognize the virtual object, wherein the control unit displays the virtual object having a first size such that the viewer perceives the virtual object as if the virtual object existed at a predetermined real space position in front of the vehicle, the control unit performs size adjustment processing of gradually increasing a size of the virtual object maintained at the predetermined real space position in response to approach of the vehicle to the predetermined real space position until the size of the virtual object becomes a second size, and, when a distance from a viewpoint position of the viewer to the predetermined real space position is referred to as a perceptual distance, during the size adjustment processing, the control unit performs adjustment such that, in at least a part of a period in which the size of the virtual object becomes the second size from the first size, when the virtual object is assumed to be a real object existing in a real space, a size change rate of the virtual object with respect to the perceptual distance is smaller than a size change rate of the real object.

2. The display control device according to claim 1, wherein, by displaying a virtual image for a left viewpoint and a virtual image for a right viewpoint having a parallax on a virtual first display surface set in front of the vehicle, the control unit causes the viewer to perceive the virtual object as if the virtual object existed on a virtual second display surface set on a farther side than the first display surface.

3. The display control device according to claim 1, wherein, when the perceptual distance is denoted by Ds, the size of the virtual object at the predetermined real space position is denoted by L, arctangent that is an inverse trigonometric function of tangent is represented as A tan, a function that converts an angle in radians to an angle in degrees is represented as degrees, θ is degrees (A tan (L/2Ds)), 2θ is 2*degrees (A tan (L/2Ds)), and 2θ is a viewing angle, the control unit uses the viewing angle 2θ as an index for indicating an apparent size of the virtual object that the viewer perceives, specifies the viewing angle 2θ corresponding to the perceptual distance on the basis of a function indicating a relationship between the perceptual distance and the viewing angle 2θ, and variably controls the size of the virtual object on the basis of the specified viewing angle 2θ.

4. The display control device according to claim 1, wherein, when the period in which the size of the virtual object becomes the second size from the first size is divided into a far period in which the vehicle is located relatively far from the predetermined real space position and a near period in which the vehicle is located relatively near the predetermined real space position, the control unit sets the size change rate of the virtual object to be the same as the size change rate of the real object in the near period.

5. The display control device according to claim 1, wherein, when the period in which the size of the virtual object becomes the second size from the first size is divided into a far period in which the vehicle is located relatively far from the predetermined real space position and a near period in which the vehicle is located relatively near the predetermined real space position, the control unit sets the size change rate of the virtual object to be larger than the size change rate of the real object in the far period.

6. The display control device according to claim 1, wherein, prior to the size adjustment processing, the control unit moves a virtual object for forward guidance, which guides forward traveling of the vehicle, from a near position of the vehicle to the predetermined real space position which is far, and, during the movement, when the virtual object for forward guidance is assumed to be the real object, the control unit adjusts a size of the virtual object for forward guidance by the size change rate of the real object.

7. The display control device according to claim 6, wherein the virtual object subject to the size adjustment processing is a virtual object for direction change guidance, which guides a direction change of the vehicle.

8. A display device comprising:

an image generation unit that generates an image;

a display unit that displays the image; and the display control device according to claim 1, wherein the virtual object is perceived by the viewer by projecting display light of the image onto a member to be projected included in the vehicle.

9. A display control method for displaying a virtual object having a first size such that a viewer riding in a vehicle perceives the virtual object as if the virtual object existed at a predetermined real space position in front of the vehicle, comprising:

a step of performing size adjustment processing of gradually increasing a size of the virtual object maintained at the predetermined real space position in response to approach of the vehicle to the predetermined real space position until the size of the virtual object becomes a second size; and, when a distance from a viewpoint position of the viewer to the predetermined real space position is referred to as a perceptual distance, during the size adjustment processing, a step of performing adjustment such that, in at least a part of a period in which the size of the virtual object becomes the second size from the first size, when the virtual object is assumed to be a real object existing in a real space, a size change rate of the virtual object with respect to the perceptual distance is smaller than a size change rate of the real object.

* * * * *